United States Patent
Kliewer et al.

(10) Patent No.: US 9,702,459 B2
(45) Date of Patent: Jul. 11, 2017

(54) PRELOAD AND TORSIONAL BACKLASH MANAGEMENT FOR A CONTINUOUSLY VARIABLE TRANSMISSION DEVICE

(71) Applicant: ORBITAL TRACTION, LTD., Houston, TX (US)

(72) Inventors: Joseph D. Kliewer, Houston, TX (US); Mark M. Koeroghlian, The Woodlands, TX (US)

(73) Assignee: Orbital Traction, Ltd., Houston, TX (US)

( * ) Notice: Subject to any disclaimer, the term of this patent is extended or adjusted under 35 U.S.C. 154(b) by 53 days.

(21) Appl. No.: 14/620,031

(22) Filed: Feb. 11, 2015

(65) Prior Publication Data

US 2016/0230859 A1 Aug. 11, 2016

(51) Int. Cl.
*F16H 15/50* (2006.01)
*F16H 61/664* (2006.01)

(52) U.S. Cl.
CPC ......... *F16H 61/6649* (2013.01); *F16H 15/50* (2013.01)

(58) Field of Classification Search
CPC .................................................. F16H 15/503
See application file for complete search history.

(56) References Cited

U.S. PATENT DOCUMENTS

| | | | |
|---|---|---|---|
| 1,380,006 A | 5/1921 | Nielsen | |
| 1,691,625 A | 11/1928 | Chilton | |
| 1,718,846 A | 6/1929 | Arter | |
| 2,349,981 A * | 5/1944 | Mulder | F16H 15/50 475/186 |
| 3,327,566 A * | 6/1967 | Hewko | F02B 63/04 475/196 |
| 3,955,661 A * | 5/1976 | Popper | F16H 13/08 160/188 |
| 4,592,247 A * | 6/1986 | Mutschler | F16H 15/503 475/189 |
| 4,593,574 A | 6/1986 | Sinn | |

(Continued)

FOREIGN PATENT DOCUMENTS

| | | |
|---|---|---|
| CN | 1428524 A | 7/2003 |
| JP | 63-297853 A | 12/1988 |

OTHER PUBLICATIONS

International Search Report and Written Opinion for International Application No. PCT/US2016/017222, mailed Apr. 26, 2016, 18 pages.

(Continued)

*Primary Examiner* — Tisha Lewis
(74) *Attorney, Agent, or Firm* — Prol Intellectual Property Law, PLLC; H. Kenneth Prol

(57) ABSTRACT

A radially inner race for a continuously variable transmission includes a first inner race structure and a second inner race structure spaced along an axis wherein at least one of the first inner race structure or the second inner race structure is axially movable. A sun shaft is coupled to the radially inner race and planetary members in rolling contact with the radially inner race, and a torsion damping mechanism is coupled to the first inner race structure to apply torque between the first inner race structure and the sun shaft to reduce a transition amplitude during a torque impulse.

27 Claims, 7 Drawing Sheets

(56) References Cited

U.S. PATENT DOCUMENTS

| | | | | |
|---|---|---|---|---|
| 4,617,838 | A | * | 10/1986 | Anderson ............... F16H 13/08 |
| | | | | 475/195 |
| 4,667,525 | A | | 5/1987 | Schottler |
| 6,461,268 | B1 | | 10/2002 | Milner |
| 8,740,743 | B2 | | 6/2014 | Kliewer |
| 2007/0093345 | A1 | | 4/2007 | Hosoi |
| 2008/0261747 | A1 | | 10/2008 | Triller |
| 2014/0094339 | A1 | * | 4/2014 | Ogawa ................... F16H 15/28 |
| | | | | 476/38 |

OTHER PUBLICATIONS

International Search Report and Written Opinion for International Application No. PCT/US2016/017425, mailed May 23, 2016, 20 pages.
International Search Report and Written Opinion for International Application No. PCT/US2016/017426, mailed May 18, 2016, 19 pages.
Non-Final Office Action issued Aug. 26, 2016 in co-pending U.S. Appl. No. 14/620,011, filed Feb. 11, 2015.
Non-Final Office Action issued Nov. 25, 2016 in co-pending U.S. Appl. No. 14/619,990, filed Feb. 11, 2015.
Non-Final Office Action issued May 3, 2017 in co-pending U.S. Appl. No. 14/620,011, filed Feb. 11, 2015.
Notice of Allowance issued May 9, 2017 in co-pending U.S. Appl. No. 14/619,990, filed Feb. 11, 2015.

* cited by examiner

US 9,702,459 B2

PRELOAD AND TORSIONAL BACKLASH MANAGEMENT FOR A CONTINUOUSLY VARIABLE TRANSMISSION DEVICE

RELATED APPLICATIONS

This application is related to U.S. patent application Ser. No. 14/619,990, entitled "Hydraulic Race Shifter for a Continuously Variable Transmission Device," by Joseph D. Kliewer et al., filed of even date herewith, which is hereby incorporated by reference.

This application is related to U.S. patent application Ser. No. 14/620,011, entitled "Symmetry Control for a Continuously Variable Transmission Device," by Joseph D. Kliewer et al., filed of even date herewith, which is hereby incorporated by reference.

FIELD OF THE DISCLOSURE

The present disclosure generally relates to a continuously variable transmission device, and more particularly relates to mechanisms for race tension preloading and backlash control mechanisms for the same. Additionally, the two race structures with torque-sensitive coupling may be resiliently biased to prime the torque-sensing reaction of the device.

BACKGROUND

Continuously variable transmission devices are known in the art. For example, on one example type of such variable transmission devices, planetary members are provided in rolling contact with inner and outer races as described in U.S. Pat. Nos. 6,461,268 and 8,740,743, assigned to the present assignee and incorporated herein by reference. The inner and outer races have two parts, with axial separation which is adjustable. The transmission ratio of input to output speed of the device is adjusted by varying the axial separation of the inner or outer race structures, which causes a corresponding radial shift of the planetary members. The axial separation of the corresponding outer or inner race structures adjusts to compensate for the radial change in position of the planetary members. The changing position of the contact points between the planetary members and the inner and outer races causes the change in transmission ratio of the device. Typically, the inner race is coupled with an input shaft and the planetary members are coupled via a planet follower arrangement to an output shaft. However, one or more input shafts and one or more output shafts may be coupled to the inner races, the outer races, or the planet follower arrangement in a variety of configurations. Application of force via springs, electric drive motor, hydraulic displacement or other mechanically driven movement are examples of methods of varying axial separation of either the inner or outer races. Such variation of axial separation shifts the continuously variable transmission.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Reference numerals are used to identify the same or analogous components in the Figures where reasonable. Embodiments incorporating teachings of the present disclosure are shown and described with respect to the drawings presented herein, in which.

DETAILED DESCRIPTION OF THE DRAWINGS

Figure 1:
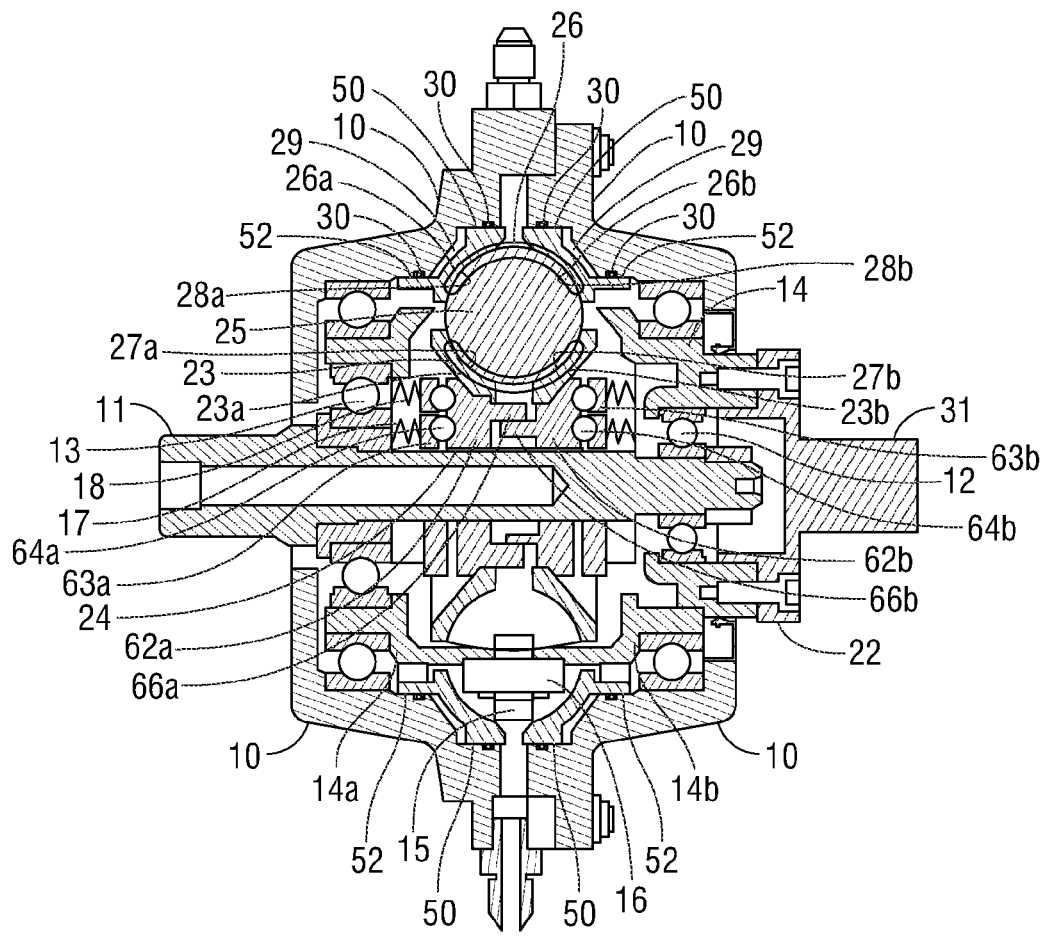
FIG. 1 is a schematic axial sectional view of a continuously variable transmission device according to an embodiment of the present disclosure.

The following description in combination with the Figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings may be utilized in this application, as well as in other applications and with several different types of interconnections of elements within the transmission systems and components disclosed.

The continuously variable transmission (CVT) mechanisms of several embodiments of the disclosure are formed as variable radius epicyclical mechanisms having rotting traction torque transfer. According to one aspect of the present disclosure, a continuously variable transmission device of the type having planetary members in rotting contact with radially inner and outer races each comprising two axially spaced parts or race structures is provided. For clarification, rolling contact is intended to mean contact that is not fixed. For example, planetary members may be in contact with race structures during operation of the CVT and roll along race structures. In another example, planetary members may be in rolling contact in some instances even though clamped by race structures during operation. In yet other instances, rolling contact may include a planetary member able to roll, but not rolling, such as when the CVT is at rest. The CVT includes a control system for selectively varying the axial separation of the two race structures of one race and thus the radial position of the planetary members in rolling contact with that race, and in which there is a system sensitive to the torque applied to a drive-transmitting transmitting member of the transmission operable to determine the compensating variation in the separation of the two race structures of the other race. This torque sensitive compensating variation determines, along with the varied axial separation of the other race, the transmission ratio of the device which in turn determines to vary the forces exchanged between the planets and the races.

In an embodiment the CVT structure, the inner and outer races include two radially inner race structures and two radially outer race structures respectively. The two race structures of the inner and outer races may be supported in such a way as to be relatively displaceable towards or away from one another. This axial movement may vary the radius of the point of contact between each race and the planetary members.

Shifting of the continuously variable transmission may occur via control system adjustment to the axial separation of either the radially inner race structures or the radially outer race structures creating a corresponding reaction in the opposite race via the rolling planetary members and their rolling contact with arcuate surfaces of the inner and outer races. Shifting may be done via hydraulic actuation of a hydraulic cavity formed as part of the inner or outer race structures, may be done with mechanical means for actuating inner or outer race structures of the inner or outer races, or may be done via other means known in the art and described in further detail in the related applications or other patents disclosed and incorporated by reference herein. In other embodiments, inner and outer races do not necessarily need to be arcuate. The rolling contact surface of inner or outer races may be planar or of another shape in various embodiments but still function in accordance with disclosures herein.

Axial separation of the opposite race structures to the shifted inner or outer races may be adjusted with a reactive force via several possible methods. A spring may apply force to spline-coupled inner or outer race structures. In other embodiments, an inclined plane such as a helical interengagement coupling on the input shaft or to a CVT housing or output shaft, may be used so that rotation of the input shaft in the intended direction causes the two structures of the reactive inner or outer race to approach each other until the force exerted on the inclined plane between the race and the input or output shaft matches the reaction forces between the race and the planetary members. In some examples a ball ramp or roller ramp may act as an inclined plane and couple an inner race or outer race structure with a CVT structure to cause force to be exerted to urge two structures of an inner or outer race to approach one another until a reactive force is matching. The inclined plane structure need not necessarily be planar, but in some embodiments may be of variable pitch or slope depending upon the desired performance characteristics. In some aspects of the present disclosure, the inclined plane structure may be substantially planar while in other aspects it may be of variable pitch or slope. Inclined plane structure is intended to cover a variety of structures that operate as described herein during matching of approach force for opposite race structures and reactive force between the race and the planetary members. When the urging and reactive forces match, no further relative axial displacement of the inner race structures or outer race structures takes place and a drive torque is transmitted at the transmission ratio determined by the radial position of the planetary members. Although this arrangement enables drive torque to be transmitted between the input and output shaft at the appropriate transmission ratio, undesirable consequences can occur. For example, some of these consequences may occur upon a change in torque direction of the input or output shaft which may cause poor performance or even damage to the CVT. Accordingly, it is desired to provide an improved variable transmission device.

According to an aspect of the present disclosure, the continuously variable transmission device described herein enables transmission of torque from an input to an output shaft and can take place in either direction of rotation. A continuously variable transmission according to embodiments herein includes planetary members in rolling contact with radially inner and outer races each comprising two axially spaced parts, with control systems for selectively varying the axial separation of the two race structures of one race and thus the radial position of the planetary members in rolling contact with that race. Additionally, according to aspects of several embodiments, there are torque sensitive couplings or a torque sensitive mechanism reactive to the torque applied to a drive-transmitting member of the transmission device. In example embodiments, a torque-sensitive mechanical coupling may be interposed between an input drive member, such as a drive shaft, and one of the races (e.g., inner or outer) to balance the torque transmission from the drive member and the contact pressures between the two race structures and the planetary members. For example, an inclined plane structure coupled to the race of the input drive member may provide for compensating variation in the axial separation of the two race structures of the opposite race. In another example embodiment, the said torque-sensitive coupling may include that of the two axially spaced, relatively moveable race structures of the opposite race, such as that of an output member or fixed to a CVT housing. Each race structure may itself be axially movable in two directional senses from a central position and engageable by a limit stop structure to allow the transmission of rotary drive from a rotary drive input such as a drive shaft to a rotary drive output shaft of the transmission device in each of two opposite senses of rotation. In one example, a radially symmetric inclined plane may include a ball ramp or roller ramp between a race structure splined to a drive shaft and a limit stop structure.

In another aspect, the race structures of the torque-sensitive coupling are connected with the input drive member such as a drive shaft by a screw-thread engagement. The torque-sensitive coupling may be included with either side race structure or included on both race structures for a race. If operatively coupled to both race structures, the screw-thread engagement on the drive shaft may be of the opposite hand for each side of the race to urge axial displacement depending on the rotary drive direction transmitted. In one embodiment, the thread flights of the screw thread engagement may be interengaged by rolling elements such as balls to form a ball screw to reduce frictional resistance in the device.

In an embodiment, the two race structures may ultimately be restrained from axial movement such that they are limited in action exerted on it by the input member. A limit stop structure may limit axial movement and may comprise respective abutments on or carried by or associated with the said input drive member or on a CVT housing.

In several embodiments, one or both races may be fully rotational, or rotationally constrained to an input or output drive member such as a shaft. In other embodiments, either race may be rotatably fixed, including being limited in rotational movement, e.g., by a torque-sensitive coupling. In example embodiments, the two race structures of a race of the transmission device may be carried on a housing of the transmission device in such a way as to have a limited rotational displacement in each of two opposite rotational senses. In other words, they may be non-rotatable having little or no rotation except for inclined plane or helical interengagement with the torque sensitive coupling. The relative axial separation of the two race structures of a race may be achieved by an inclined interengagement of at least one of the two race structures with a fixed member of the transmission device, the two race structures both having limited rotation with respect to the said fixed member.

In view of the various possible configurations including a torque sensitive device whereby either the inner or outer race, or both, may be fully rotational and operatively coupled to either an input or an output shaft, operational situations may arise whereby there is a torque transition. The torque transition may take place via the input shaft and may be operationally transferred to the output shaft via one or more CVT components. As discussed above, one or more input shafts may be operatively coupled to any of the inner race, outer race, or planet follower members in various aspects. Additionally, one or more output shafts may be operatively coupled to any of the inner race, outer race, or planet follower members although not to the same as the input shaft. In yet other aspects, any of the inner race, outer race, or planet follower members may be rotatably fixed as discussed above.

A torque transition may take place in the form of a torque impulse to increase or decrease torque applied in an angular displacement direction of an already rotating input or output shaft. This may cause a transition amplitude during the increase or decrease change in torque applied. In some aspects, a torque impulse may take place as a reversal of angular displacement direction of rotation for either an input or output shaft. Such a change is a torque reversal. In any case, as a torque impulse is passed though the CVT components, especially a reversing torque transition, it may cause a transition amplitude and backlash which may result in wear or damage to components of the CVT in certain aspects. In the case of a torque reversal for example, a transition deadband and backlash may be experienced.

The CVT described above uses a reactive clamping mechanism that provides axial load in proportion to torque applied via an input shaft. This reactive clamping mechanism is supplied by the torque-sensitive mechanism or coupling described above. This same torque-sensitive mechanism also may allow for axial displacement between raceway members. In an example mechanism, a ball ramp or a roller ramp may be the torque sensitive mechanism. The ball ramp or roller ramp is radially symmetric, this allows for identical operation independent of torque direction. One of the consequences of having a reactive clamping mechanism that can accommodate reverse torque and axial displacement is backlash. While transition amplitude or backlash elimination may be difficult in certain CVT configurations, it can be managed as described in several embodiments herein.

In previous designs, very little torque resistance existed when taking up the backlash during a reversing torque transition. As a result, the speed of the driving member of the torque, e.g., the input shaft or output shaft, and the race to which it is coupled is allowed to accelerate during a torque reversal. This acceleration occurs until the backlash is taken up in the torque sensitive mechanism. This may result in large torque spikes in the components of the CVT. To better manage this, a torsion damping mechanism is implemented to apply torque resistance to the race coupled to the input or output shaft to mitigate transmitting the torque transition. In an example embodiment, a working spring or other damper may be added and operatively coupled to the race. In example embodiments, the torsion damping mechanism may be implemented as an increased preload spring with stiffer torsional resistance than would be used by those of ordinary skill in the art or a separate torsional damping mechanism, such as a spring causing torsional resistance, may be implemented. In some aspects, adding a separate torsion damping mechanism may add complexity but may be desirable in some designs.

The torsion damping mechanism applies torque between a torque applying member such as an input shaft and an inner or outer race. The torsion damping mechanism permits angular displacement greater than the typical rotation of any torque sensitive inclined plane mechanism operatively coupled in the CVT. For example, the torsion damping mechanism applies torque in an embodiment to permit angular displacement between the torque input such as an input or output shaft and a race of greater than 15 degrees. In some embodiments, angular displacement above 30 degrees is permitted with application of angular displacement torque from the torsion damping mechanism. The added torsional resistance of the torsion damping mechanism on the race limits backlash, and may overcome any disadvantage of the added force required to shift the transmission, or of loss due to added friction. In an embodiment, torsion damping mechanisms may be operatively coupled to either side or both sides of an inner or outer race. The torsion damping mechanisms may be oppositely resiliently biased. The opposite axial bias of the torsion damping mechanism may "prime" the torque-sensing reaction. Torque resistance may be achieved by torsion damping mechanisms such as a compression spring, torque spring, flat spring, coil spring, or other damping mechanism operable to apply angular torque force sufficient for torque resistance to prime a torque sensing reaction in the torque-sensitive mechanism of a CVT. In an example embodiment, the torsion damping mechanism used may apply a medium force that is a choice between a force that is so high it causes highly detrimental effects on shifting or one that is too tow to mitigate backlash during torsional transition. The force levels are discussed further below.

In yet another aspect, two race structures forming an inner race or an outer race are rotationally constrained to one another to form a type of race assembly according to other embodiments of the present disclosures. The race structures may also be rotationally constrained with respect to a rotating input or output shaft or an inclined plane structure operatively coupled to a housing. For example, if an outer race is part of a hydraulic outer race assembly similar to embodiments in the above related applications incorporated herein by reference, it is possible that the rolling planetary members may float axially with respect to the outer race assembly. In an embodiment, the radially inner race structures, each with an arcuate rolling contact surface, are rotationally constrained with respect to one another and must rotate in symmetry. Since the radially inner race structures may also be rotationally constrained with respect to an input or output shaft via helical inter-engagement or other inclined plane engagement, the radially inner race structures may maintain symmetry and limit or eliminate axial "float" of the rolling planetary members. The reverse arrangement is also contemplated wherein the radially inner race structures are part of a hydraulic inner race assembly in other embodiments. In this case, the radially outer race structures may be rotationally constrained to one another and to an inclined plane structure that is fixed or coupled to a rotating input or output shaft. In addition, rotationally constraining opposite race structures to one another may permit a torsion damping mechanism to be used in connection to one side of the race and use of a torsion damping mechanism on both sides may not be necessary.

FIG. 1 shows a continuously variable transmission (CVT) in an embodiment of the present disclosures. In the example embodiment, the CVT is a variable radius epicyclical transmission device. The CVT shown depicts a housing 10 within which is mounted an sun shaft 11, and rolling element bearings 12, 13 within a planet carrier 14 carrying three planet follower members 15. The planet follower members 15 are rotatably borne on the planet carrier 14 by planet follower shafts 16. Any number of planet follower members 15 are contemplated and may depend on the number of spherical planetary members 25. The spherical planetary members 25 are substantially spherical as described below and captive between the radially inner races 23 and the radially outer races 26. The planet follower members 15 are circumferentially intercalated between adjacent pairs of spherical planetary members 25 for transmitting drive to or from the said spherical planetary members 25. In an embodiment, planet follower members 15 are carried on planet carrier 14 by planet follower shafts 16 which transmit drive to or from spherical planetary members 25 in operation of the CVT device.

The planet carrier 14 is effectively coupled to axial cylindrical extension 22 of the planet carrier 14 and may comprise an output in one embodiment. Planet carrier 14 may be further coupled to output shaft 31 of the transmission mechanism via the extensions 22. It is understood that the input and output relationship described above may also be reversed in other embodiments. Alternatively, the input and output shafts may be coupled to any of the inner race 23, the planet carrier 14, or the outer race 26 in various embodiments.

In an embodiment, sun shaft 11 may carry a radially inner race 23 comprising a sun member including two structures 23a, 23b which are engaged to the shaft 11. Sun shaft 11 may also be referred to as a sun shaft 11 in some embodiments or an output shaft 11 in other embodiments depending upon the arrangement. Radially inner race 23 may be coupled to the input shaft via a coupling comprising a spline or other coupling including torque sensitive inclined plane structures 63a and 63b such as roller ramps or ball ramps or other structures understood in the art. Further, inclined plane structures need not be planer, but may be of variable pitch or slope as described above.

In an embodiment, the torque sensitive inclined plane structures 63a and 63b are torque sensitive in a plurality of angular displacement directions. The torque sensitive inclined plane structures 63a and 63b may accommodate torque applied to the system via either shaft 11 or 31 in either torque direction.

In one embodiment, radially inner race structures 23a and 23b are coupled to sun shaft 11 via a spline. Radially inner race structures 23a and 23b are axially movable along the axis of rotation of the sun shaft 11. Inward axial movement may be urged by a mechanical, electromechanical, or hydraulic mechanism as described in various embodiments incorporated herein by reference. In the presently shown embodiment, springs 17 are used to apply a preload force to urge axial movement of radially inner race structures 23a and 23b for clamping of the inner race 23 to the spherical planetary members 25. Additionally, one or more torsion damping mechanisms 18 are coupled to the radially inner race structures 23a and 23b to apply a priming torque to inner race 23 or torque sensitive inclined plane structures 63a and 63b. Other couplings to the sun shaft 11 are also contemplated. Torsion damping mechanisms 18 in the shown embodiment are disk springs to apply a resilient bias to "prime" the torque-sensing reaction of the device, for example, during an impulse in a torque transition, such as a reversal in torque on sun shaft 11 or shaft 31. In the presently shown embodiment, sun shaft 11 acts as an input shaft and shaft 31 is an output shaft, but the input-output relationship may be reversed in this and other embodiments depending on configuration as is understood. Additionally, the torsion damping mechanism 18 may be operatively coupled to one or more radially inner race structures 23a and 23b via other structures. For example, in the presently shown embodiment, the torsion damping mechanism is operatively coupled to the radially inner race structures 23a and 23b via one or more torque sensitive inclined plane structures 63a and 63b. In an embodiment, the torque sensitive inclined plane structures 63a and 63b may be oppositely axially resiliently biased.

Spherical planetary members 25 are engaged between the radially inner race 23 and a radially outer race 26. Radially outer race 26 also comprises two axially separated annular race structures 26a, 26b. Rolling contact surfaces of the race structures 23a, 23b and 26a, 26b, respectively identified as 27a, 27b and 28a, 28b each include, in cross-section, an arcuate surface the radius of which is slightly greater than the radius of the spherical planetary members 25. Hereinafter, spherical planetary members include planetary members that are substantially spherical bodies or have surfaces of revolution that are spherical or substantially spherical. Substantially spherical as is understood may include right circular, oblate or prolate spheroids or other structures capable of symmetrical revolution. Alternatively, the planetary members may have respective first and second surface portions comprising surfaces of revolution about the same axis (for each member) the surface portions being inclined with respect to one another in opposite directions about the axes of revolution and only the surface portions of the planetary member in rolling contact with inner or outer races being substantially spherical. The spherical planetary members may have a convex or concave surface of revolution defined by a curved generatrix which may be a regular or irregular curve or a part-circular curve. In the case of a part-circular generatrix this may be a semi-circle, in which case the surface of revolution of the planetary member is substantially spherical.

Axial adjustment mechanisms may be made via hydraulic systems as described in related applications cited herein by reference or in different embodiments may include a mechanical system such as a lever or arm, screw mechanism, and electromechanical mechanism or other mechanism to axially adjust the distance between radially outer race structures 26a, 26b. In other embodiments, axial adjustment mechanisms may be used to axially adjust the distance between radially inner race structures 23a, 23b (not shown).

In operation of shaft 11, as an input shaft in one embodiment, torque from shaft 11 causes rotation and the transmission rotation of the shaft 11 is transmitted to the inner race 23, rotation of which causes rotation of the spherical planetary members 25 by rolling contact. The spherical planetary members 25 are in rolling contact with outer race 26. In one embodiment, outer race 26 may rotate and connect to another output shaft. In other embodiments, outer race 26 may be non-rotating.

Rotation of the spherical planetary members 25 is transmitted via the planet followers 15 to the planet carriers 14 and thus to the output shaft 31. Spherical planetary members 25 are also in rolling contact with outer race 26. Shifting may occur by mechanical, hydraulic or other actuation of two radially outer race structures 26a, 26b of the outer race 26. Upon actuation, the two radially outer race structures 26a, 26b are urged towards one another or allowed to move axially away from one another respectively. Axial approach of the two radially outer race structures 26a, 26b applies pressure to the spherical planetary members 25 causing the spherical planetary members 25 to move radially inwardly and urge the two radially inner race structures 23a, 23b apart. In an embodiment, a torque sensitive inclined plane structure 63a, 63b between the radially inner race structures 23a, 23b and the shaft 11 acts in effect as a torque-sensitive mechanism such that rotation of the shaft 11 in the intended direction of drive causes the race structures 23a, 23b to approach one another axially when resisted by drag so that any play in the rolling contact between the races and the spherical planetary members 25 is taken up and compensated by the tendency of the race structures 23a, 23b to approach one another until the forces exerted on the helical interengagement between the race structures 23a, 23b and the drive shaft 11 matches the reaction forces between the race structures 23a, 23b and the spherical planetary members 25. At this point no further relative axial displacement of the race structures 23a, 23b takes place and drive transmission takes place at a transmission ratio determined by the radial position of the spherical planetary members 25 when this occurs.

The torque sensitive inclined plane structures 63a, 63b may be radially symmetric such as roller ramps or ball ramps. Radial symmetry of a torque sensitive inclined plane structures 63a, 63b allow for identical torque sensitive clamping independent of torque direction. During a change in torque, the torque sensitive inclined plane structures 63a, 63b provide a proportional axial load on the system. In the present embodiment of FIG. 1, the torque sensitive inclined plane structures 63a, 63b are operatively connected to the radially inner race 23 and to shaft 11. In other embodiments, the torque sensitive inclined plane structures 63a, 63b may be in other locations and serve the same purpose of providing proportional axial load on the system in reaction to applied torque. For example, the torque sensitive inclined plane structures 63a, 63b may be operatively connected to the radially outer race 26 and the housing 10. In yet other embodiments, the torque sensitive inclined plane structures 63a, 63b may be operatively connected to the planet carriers 14 or other rotating structures.

During a torque reversal on sun shaft 11 or on output shaft 31, the radially symmetric torque sensitive inclined plane structures 63a, 63b reverse to provide proportional axial movement in response to the reverse torque direction as well. However, as a torque transition to the reverse torque direction occurs in the CVTs of the presently described embodiments, a backlash or torque spike may occur. This happens as the radially symmetric torque sensitive inclined plane structures 63a, 63b reach the bottom part or trough of the inclined plane before proceeding up the reverse inclined plane to provide proportional axial movement to the system. At the bottom or trough of the torque sensitive inclined plane structures 63a, 63b there is very little resistance to the torque transition.

The backlash or torque spike during such a torque transition may cause a jarring or slamming of the rotating components in the CVTs of the present disclosures depending on the severity of the backlash. This can precipitate damage or excessive wear of components. While backlash is difficult to eliminate, it may be better managed. Application of a priming torque via torsion damping mechanisms 18 to the torque sensitive inclined plane structures 63a, 63b may provide for reduction of the backlash or torque spike during torque transition. As described, torsion damping mechanisms 18 may be a torsion spring, disk spring or other structure to apply a priming torque to the torque sensitive inclined plane structures 63a, 63b or other rotating structures to mitigate the backlash or torque spike during torque transition. In other embodiments as described below, the preload spring may be increased in applied torsional force to also serve to act as a torsion damping mechanism 18. The preload spring, therefore, may be simultaneously used to apply a torque preload during torque transition.

The force applied via the torsion damping mechanisms 18 is substantially higher than the amount for preloading in previous embodiments of the CVTs of the present disclosure. During testing, it was found that currently used preload springs made effectively no contribution to torsion damping during torque transition although preload force was sufficient for operation of the epicyclical CVTs of the present disclosures. Additional torsional spring force application via the torsion damping mechanisms 18 is counterintuitive due to the increased friction and power loss due to over clamping in the operation of the epicyclical CVT of the current disclosures, for example during light drive torque operation. Similarly, it is counterintuitive because the added torsional spring force of the torsion damping mechanisms 18 requires additional force for shifting the CVT. Nonetheless, the additional of torsion damping mechanisms 18, or an increased preload spring acting as a torsion damping mechanism, discussed further below, yields substantial benefit in reduction of backlash during torque transition.

In an embodiment, the torsion damping mechanisms 18 were Belleville springs or disk spring stacks. Each disk spring may provide certain spring rating depending on dimensions, thickness, and material type. Additionally, spring force may be controlled depending on stacking of the disk springs, either with arced disk structure nested or opposing to provide varying spring force and compression travel dimensions. The disk springs or Belleville springs have an added benefit of having high load density enabling a reduction of package volume for the epicyclical CVT structures in the present disclosures. Too much torsional or axial force applied via the torsion damping mechanisms 18, however, was detrimental to the efficient operation of the epicyclical CVTs of the present disclosures. For example, if a spring set used as torsion damping mechanisms 18 were too heavy, it could limit shifting ratios available including axial travel of the radially inner race structures 23a and 23b. If the spring set used as torsion damping mechanisms 18 were too tight, and no additional preload spring is used to maintain traction during torque impulses, such as torque reversals, the system may be prone to gross slipping and corresponding lost torque transmission. Selection of the spring set used as torsion damping mechanisms 18 will depend on several factors including dimensions of the epicyclical CVT, the torque levels applied through the system, and the speeds of rotation during operation of the CVTs among other factors. Moreover, the beneficial effects of the torsion damping mechanisms 18 will also depend on the expected characteristics of the torque transition. For example, amplitude (e.g., N*m) of the torque transition or the time interval or speed of the torque transition have direct effects on the magnitude of the backlash or torque spike experienced by the system. Thus, design tradeoffs may be made about the level of spring set used as torsion damping mechanisms 18 depending on expected aspects of torque transitions and dimensions and operating characteristics of the epicyclical CVT.

Figure 2:
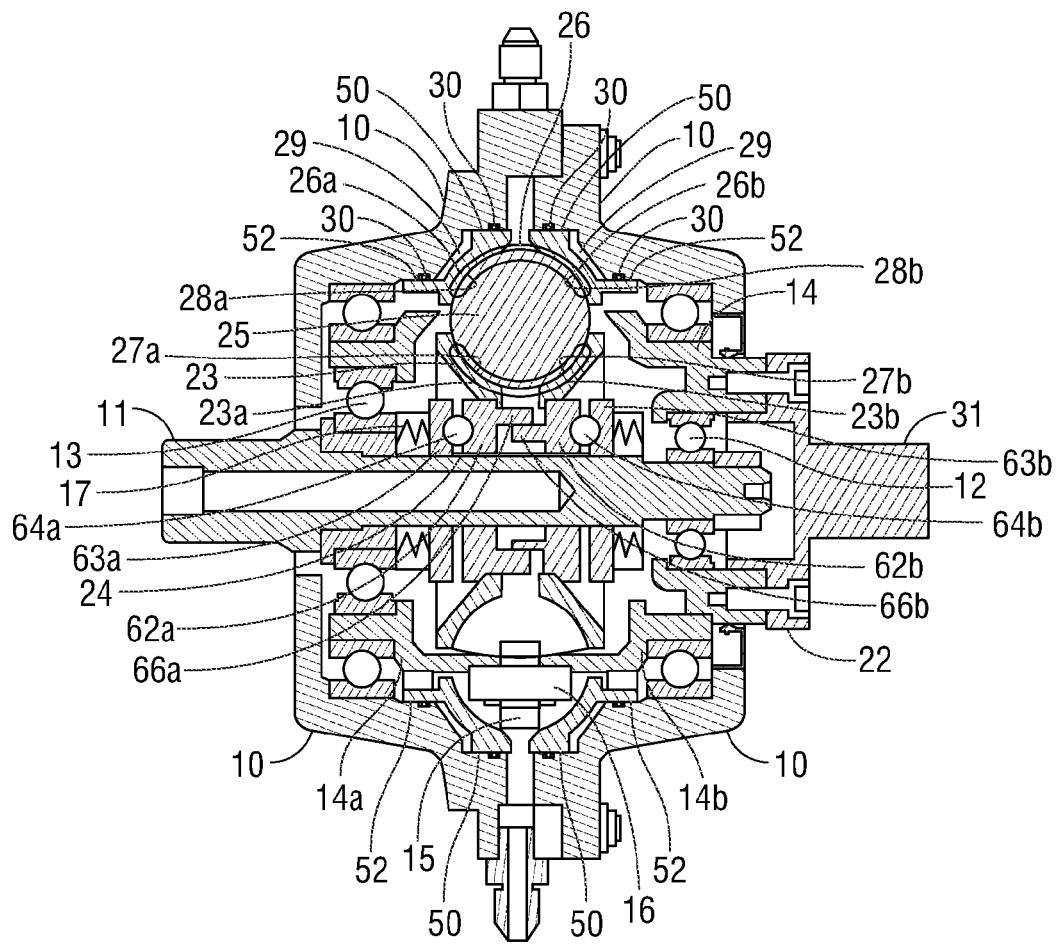
FIG. 2 is another schematic axial view of a continuously variable transmission device according to an embodiment of the present disclosure.

FIG. 2 shows a continuously variable transmission (CVT) in another embodiment of the present disclosures. In the example embodiment, the CVT is a variable radius epicyclical transmission device. The CVT shown depicts a housing 10 within which is mounted on a sun shaft 11, and rolling element bearings 12, 13 within a planet carrier 14 carrying three planet follower members 15. The planet follower members 15 are rotatably borne on the planet carrier 14 by planet follower shafts 16. Any number of planet follower members 15 are contemplated and may depend on the number of spherical planetary members 25. The spherical planetary members 25 are substantially spherical as described below and captive between the radially inner races 23 and the radially outer races 26. The planet follower members 15 are circumferentially intercalated between adjacent pairs of spherical planetary members 25 for transmitting drive to or from the said spherical planetary members 25. In an embodiment, planet follower members 15 are carried on planet carrier 14 by planet follower shafts 16 which transmit drive to or from spherical planetary members 25 in operation of the CVT device.

In an embodiment, the planet carrier 14 may be effectively comprised by two radial plates 14a, 14b joined together by shouldered studs 16 forming the planet follower shafts. An axial cylindrical extension 22 of the radial plate 14b of the planet carrier 14 comprises an output and may be further coupled to the output shaft 31 of the transmission mechanism. It is understood that the input and output relationship described above may also be reversed in other embodiments. In other words, shaft 31 may be an input shaft and sun shaft 11 may be an output shaft. It is also understood that in other embodiments, an input or output shaft may couple to radially outer race 26 if radially outer race 26, or some portion thereof, is rotatable and arranged to transmit rotation to or from the epicyclical CVT. In yet other embodiments, a plurality of input or output shafts is contemplated being coupled to rotating components of the CVT.

In a current embodiment, sun shaft 11 may carry a radially inner race 23 comprising a sun member including two structures 23a, 23b which are engaged to the shaft 11. Radially inner race 23 may be coupled to the sun shaft 11 via a coupling comprising a spline or other coupling including a torque sensitive inclined plane structure such as a helical interengagement in the form of a screw threaded engagement (not shown). In one embodiment, radially inner race structures 23a and 23b are coupled to sun shaft 11 via a spline. Radially inner race structures 23a and 23b are axially movable along the axis of rotation of the sun shaft 11. Inward axial movement may be urged by a mechanical, electromechanical, or hydraulic mechanism as described in embodiments below. In the presently shown embodiment, springs 17 are used to apply a preload force to urge axial movement of radially inner race structures 23a and 23b for clamping of the inner race 23 to the spherical planetary members 25. Other couplings to the sun shaft 11 are also contemplated. In some embodiments, the two radially inner race structures 23a and 23b have torque sensitive inclined plane structures 63a, 63b, such as a ball ramp or roller ramp for reasons which are described in more detail above, in the incorporated related applications, and in U.S. Pat. No. 6,641,268, incorporated herein fully by reference. A relative rotation of the sun shaft 11 and the radially inner race structures 23a, 23b in one directional sense will cause the two race structures to be displaced towards one another whereas axial separation of the two race structures 23a, 23b of the inner raceway occurs where there is relative rotation between them and the sun shaft 11 in the opposite directional sense.

Preload springs 17 may also act as torsion damping mechanisms. Preload springs 17 may provide a priming torque three and act as a torsion damping mechanisms during torque transitions on shaft 11 or 31, depending upon configuration. In this embodiment, preload spring 17 are also torsion damping mechanisms 17 and provide both torque priming in addition to providing a preload force described herein. For example, preload springs 17 may be heavy enough to behave similarly to the torsion damping mechanisms 18 of FIG. 1. Operation of the dual purpose springs 17 will be similar to the torsion damping mechanisms 18 described in FIG. 1 above to reduce or mitigate backlash or torque spikes during torque transitions such as during torque reversals. Selection of a spring set 17 that is too heavy may have overly detrimental effects such as over clamping or increased shifting force requirements as described above. If spring set 17 is too tight, slippage is possible due to insufficient resistance during the torque transition.

In the CVT embodiment of FIG. 2, spherical planetary members 25 are engaged between the radially inner race 23 and a radially outer race 26. Radially outer race 26 also comprises two axially separated annular race structures 26a, 26b. Rolling contact surfaces of the race structures 23a, 23b and 26a, 26b, respectively identified as 27a, 27b and 28a, 28b each include, in cross-section, an arcuate surface the radius of which is slightly greater than the radius of the spherical planetary members 25. Hereinafter, spherical planetary members include planetary members that are substantially spherical bodies or have surfaces of revolution that are spherical or substantially spherical. Substantially spherical as is understood may include right circular, oblate or prolate spheroids or other structures capable of symmetrical revolution. Alternatively, the planetary members may have respective first and second surface portions comprising surfaces of revolution about the same axis (for each member) the surface portions being inclined with respect to one another in opposite directions about the axes of revolution and only the surface portions of the planetary member in rolling contact with inner or outer races being substantially spherical. The spherical planetary members may have a convex or concave surface of revolution defined by a curved generatrix which may be a regular or irregular curve or a part-circular curve. In the case of a part-circular generatrix this may be a semi-circle, in which case the surface of revolution of the planetary member is substantially spherical.

The radially outer race structures 26a, 26b are coupled to housing 10 via hydraulic cavity 29 which may act as an axial adjustment mechanism via hydraulic displacement in an embodiment as described above, in the incorporated related applications. Additional shifting mechanisms, such as mechanical or electromechanical shifting systems are contemplated in addition to hydraulic shifting of the present embodiment. For example, other axial adjustment mechanisms are also contemplated in different embodiments including a mechanical system such as a lever or arm, screw mechanism, and electromechanical mechanism or other mechanism to axially adjust the distance between radially outer race structures 26a, 26b. In other embodiments, hydraulic cavity 29 may be formed between radially outer race structures 26a, 26b and an outer race hydraulic cavity housing (not shown) located between the radially outer race structures 26a, 26b and housing 10. In one such embodiment therefore, the outer race assembly may be rotatable with respect to an input or output shaft, including radially outer race structures 26a, 26b.

In operation of shaft 11, an input shaft in one embodiment, the transmission rotation of shaft 11 is transmitted to the inner race 23, rotation of which causes rotation of the spherical planetary members 25 by rolling contact. The spherical planetary members 25 are in rolling contact with outer race 26. In one embodiment, outer race 26 may rotate and connect to another output shaft. In other embodiments, outer race 26 may be non-rotating. Rotation of the spherical planetary members 25 is transmitted via the planet followers 15 to the planet carrier 14 and thus to the output shaft 31. Spherical planetary members 25 are also in rolling contact with outer race 26.

By adjusting axial distance between two radially outer race structures 26a, 26b of the outer race by urging towards one another or allowing them to move axially away from one another respectively, shifting of the epicyclical CVT may be achieved. Axial approach of the two radially outer race structures 26a, 26b applies pressure to the spherical planetary members 25 causing the spherical planetary members 25 to move radially inwardly and urge the two radially inner race structures 23a, 23b apart. In an embodiment, a torque sensitive inclined plane structure 63a, 64a, 63b and 64b, for example a ball ramp shown in the present embodiment, between the radially inner race structures 23a, 23b and the shaft 11 acts in effect as a torque-sensitive mechanism in that rotation of the shaft 11 in the intended direction of drive causes the race structures 23a, 23b to approach one another axially when resisted by drag so that any play in the rolling contact between the races and the spherical planetary members 25 is taken up and compensated by the tendency of the race structures 23a, 23b to approach one another until the forces exerted on the helical interengagement between the race structures 23a, 23b and the drive shaft 11 matches the reaction forces between the race structures 23a, 23b and the spherical planetary members 25. At this point no further relative axial displacement of the race structures 23a, 23b takes place and drive transmission takes place at a transmission ratio determined by the radial position of the spherical planetary members 25 when this occurs.

During a torque impulse such as a torque reversal, torsion damping mechanisms in the form of springs 17 having sufficient torque application may mitigate a torque transition amplitude spike or a backlash. For example, a transition amplitude or backlash deadband may occur during a torque transition in the epicyclical CVT having a radially symmetric torque sensitive inclined plane structure 63a, 64a, 63b and 64b. Upon transition, such as reversal in torque direction, a trough or low point is reached where no resistance or clamping occurs until the torque sensitive inclined plane structure 63a, 64a, 63b and 64b re-engages in the reverse direction. Upon re-engagement, a backlash may be experienced. To avoid this, a priming torque or damping is applied via torsion damping mechanism 17 in the present embodiment. This torsion damping mechanism 17 applies torque to limit backlash effects of the torque transition experienced with the radially symmetrical torque sensitive inclined plane structure 63a, 64a, 63b and 64b.

Figure 3:
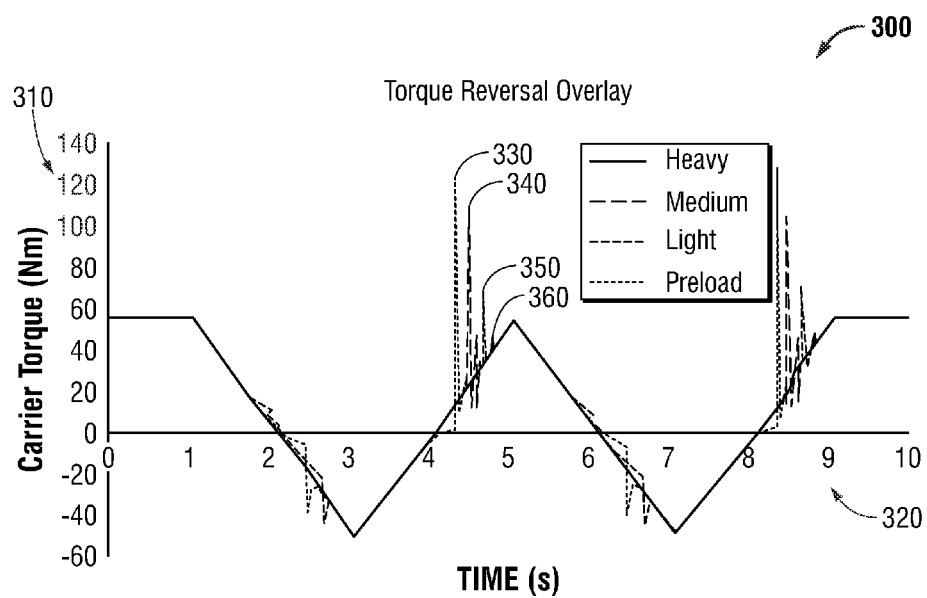
FIG. 3 is a data overlay display of torque reversal for a plurality of continuously variable transmission device arrangements according to embodiments of the present disclosure.

FIG. 3 illustrates effects of a plurality of torsion damping mechanisms on backlash during torque transitions of an epicyclical CVT such as those of the present disclosures. FIG. 3 shows a torque reversal data overlay 300 for a CVT for four example CVT arrangements. The effects of increased torsional damping and preload may be seen on the torsion spike or backlash effect. As shown, the effect is more pronounced in torque reversal transition from negative torque to positive torque than in the opposite transition in some embodiments. One shown arrangement has little or no torsion damping mechanism, using only a preload spring such as a wave spring. The other overlaid data shows three system arrangements having levels of torsional damping: light, medium, and heavy. The right axis 310 shows carrier torque in Nm. The horizontal axis 320 shows time during a series of four torque reversals. The torque transition time for these torque reversals is at 2 second sweeps. The speed of torque reversal impacts the amplitude of the spikes whereupon faster transitions show higher spikes. The sweeps were transitioned from 50 Nm positive torque to −50 Nm torque.

The CVT system tested with only a preload spring shows a very high backlash torque spike 330 during transition. In the next torque reversal test, light torsion damping was used in a torsion damping mechanism. In an example embodiment, the arrangement involved stacking six light weight disk springs in series as a torsion damping mechanism. For example, a light weight disk spring may have approximate dimensions of 40×20.4×1×2.3 mm. Other dimensions similar to these are contemplated depending on the material used. As can be seen in FIG. 3, the backlash spike 340 is somewhat reduced.

Overlaid on the data of FIG. 3 is a third torque reversal test utilizing medium torsion damping. In another embodiment, the arrangement involved stacking four medium weight disk springs as a torsion damping mechanism. For example, a medium weight disk spring may have approximate dimensions of 40×20.4×1.5×2.65 mm. Other dimensions of medium weight springs similar to these are contemplated depending on the material used. As can be seen in FIG. 3, the backlash spike 350 is substantially reduced. A fourth overlay of FIG. 3 includes a fourth torque reversal test utilizing heavy torsion damping. In an embodiment, the arrangement involved stacking three heavy weight disk springs in series as a torsion damping mechanism. For example, a heavy weight disk spring may have approximate dimensions of 40×20.4×2×3.1 mm. Other dimensions of heavy weight springs similar to these are contemplated depending on the material used. Backlash spike 360 reflects a very substantial reduction with heavy torsion damping. However, it was found that at a certain level of torsional damping, drawbacks such as greater force to shift, greater friction, and over clamping as described above could cause impact on CVT performance. In certain embodiments, however, it is contemplated that the above-described potential drawbacks may nonetheless be tolerable depending upon the usage of the CVT. Thus, heavy torsion damping is incorporated as a useful embodiment in the present disclosures.

Figure 4:
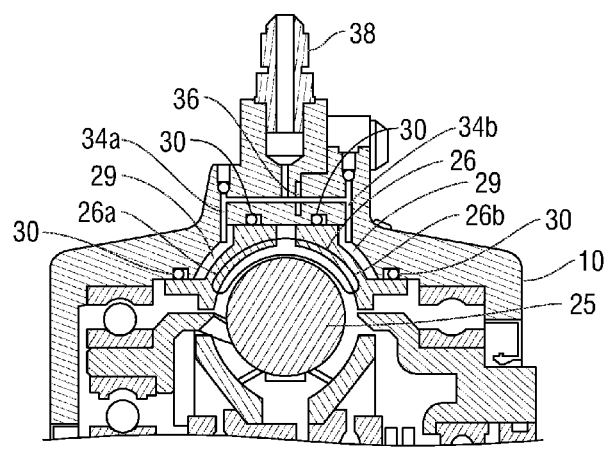
FIG. 4 is another schematic axial view of a continuously variable transmission device according to an embodiment of the present disclosure.

FIG. 4 shows a closer view of a CVT in another embodiment. As can be seen, radially outer race structures 26a and 26b form outer race 26 which may be in rolling contact with spherical planetary member 25. Hydraulic cavity 29 is formed between radially outer race structures 26a and 26b and CVT housing 10. In other embodiments, hydraulic cavity 29 may be formed between radially outer race structures 26a and 26b and a hydraulic cavity structure such as an outer race hydraulic cavity housing (not shown) separate from the CVT housing 10. Hydraulic ports 34a and 34b permit adjustment to hydraulic pressure in the hydraulic cavity 29. Input or removal of hydraulic fluid may be made via connector port 38. Hydraulic bridge 36 may link hydraulic ports 34a and 34b to permit uniform application of hydraulic pressure in hydraulic cavities 29 associated with radially outer race structures 26a and 26b in one embodiment. In this way, some uniformity and symmetry may be maintained between radially outer race structures 26a and 26b, especially when positive hydraulic pressure is applied. Nonetheless, it is possible for radially outer race structures 26a and 26b to float or slide to one or the other side causing spherical planetary members 25 and inner race 23 to also potentially slide. This is addressed more fully below.

Input ports 34a, 34b and hydraulic bridge 38 allows for hydraulic fluid connection to the CVT to allow control over hydraulic displacement for radially outer race structures 26a and 26b via the hydraulic cavities 29. Sealing mechanisms 30 are used to establish one or more hydraulic cavities between radially outer race structures 26a and 26b and housing 10. In other embodiments, an outer race hydraulic cavity housing or other hydraulic cavity structure may also be fitted with radially outer race structures and be of varied shapes to accommodate a hydraulic cavity. The sealing mechanisms 30 may be an o-ring, sealing layer, or a fluid bearing formed of hydraulic fluid at a junction point or points that are in close proximity between radially outer race structures 26a and 26b and housing 10. Such junction points may be, for example, edges or shoulders of a distal surface of radially outer race structures 26a and 26b and housing 10 or other hydraulic cavity structure designed to fit together in close proximity. Corresponding edges or shoulders of an inner surface of housing 10 or another hydraulic cavity structure are in close proximity to the edges of shoulders of the distal surface of the radially outer race structures. The sealing mechanisms 30 still may permit radially outer race structures 26a and 26b to move axially. In some embodiments, sealing mechanisms 30 may permit radially outer race structures 26a and 26b also to rotate about the axis of sun shaft 11.

In the configurations illustrated in FIGS. 2 and 4 it will be seen that when the radius of rolling contact between the spherical planetary members 25 and the inner race 23 is relatively small and the radius of contact between the spherical planetary members 25 and the outer race 26 is also relatively small, the transmission ratio between the sun shaft 11 and output shaft 31 is at a low level. By relaxing hydraulic displacement with a negative displacement in hydraulic cavity 29, outer race structures 26a, 26b are allowed to move apart so that the spherical planetary members 25 can move radially outwardly as compensated by axial approach of the radially inner race structures 23a, 23b. This increases the transmission ratio between the sun shaft 11 and output shaft 31.

By actuating hydraulic displacement in hydraulic cavity 29, outer race structures 26a, 26b are urged to move together so that the spherical planetary members 25 can move radially inwardly again as assisted by axial approach of the radially inner race structures 23a, 23b. This again reduces the transmission ratio.

The difference between the curvature of the curved rolling contact surfaces 28a, 28b of radially outer race structures 26a, 26b and curved rolling contact surfaces 27a, 27b of radially inner race structures 23a, 23b of the races 26, 23 and the shape of the spherical planetary members 25 will determine the precise shape of the contact path which changes in response to transmission ratio changes. Although the contact may be a point contact, in practice, because the interior of such a variable transmission would contain a lubricant in the form of a special traction fluid which both lubricates the moving parts and enhances the rolling traction between them, the points of contact will comprise contact patches which may be larger the closer the radii of the contacting surfaces are to one another.

The continuously variable transmission mechanism described above is extremely compact and highly efficient. A pressurized hydraulic circuit connected to input port 38 may be used for control purposes in order to achieve the required function.

Figure 5A:
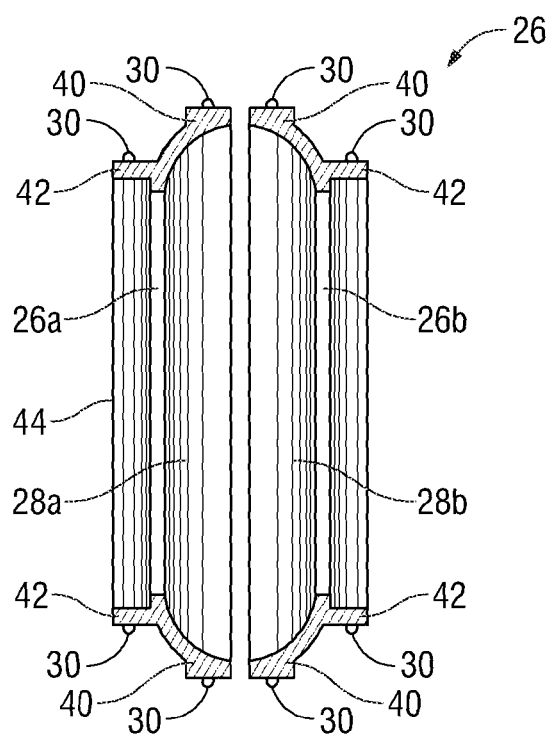
FIG. 5A is a schematic axial section view of an outer race component according to an embodiment of the present disclosure.
Figure 5B:
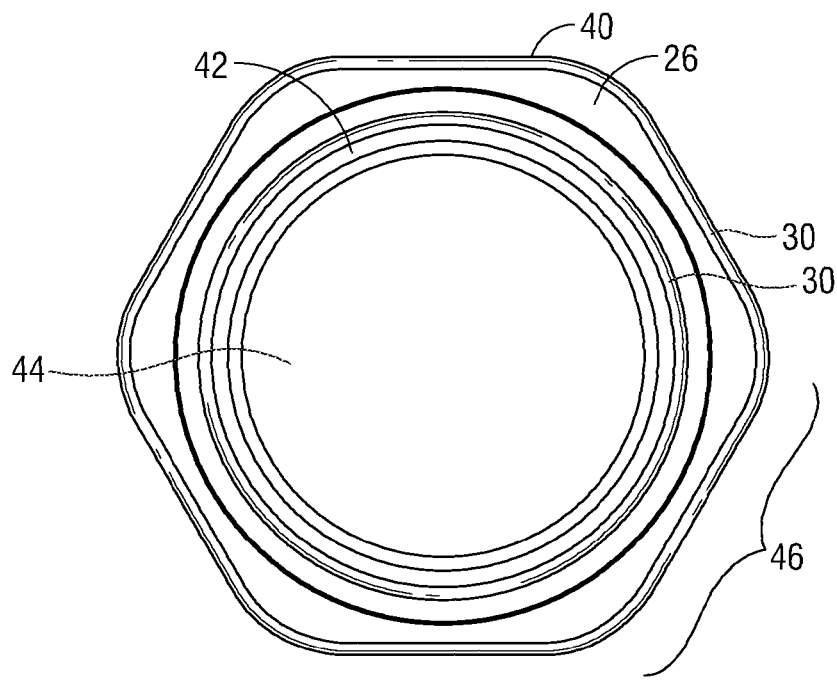
FIG. 5B is a schematic view of an outer race component according to an embodiment of the present disclosure.

FIG. 5A shows a cross section of radially outer race structures 26a and 26b of one example embodiment of an outer race 26. FIG. 5B shows a side view of a race structure of outer race 26 in accordance to another embodiment of the present disclosures. Radially outer race structures 26a and 26b are shown and include arcuate rolling contact surfaces 28a and 28b. Sealing mechanisms 30 are shown in the present embodiment mounted on a surface opposite to arcuate rolling contact surfaces 28a and 28b and distal to a plane of rotation for the spherical planetary members 25. In this example embodiment, o-ring sealing mechanisms are shown, but several alternate sealing mechanisms are contemplated including example embodiments discussed further above. In other embodiments, sealing mechanisms may be mounted on a housing or other hydraulic cavity structure that is designed to fit with radially outer race structures 26a and 26b to create a hydraulic cavity as described above. In yet another embodiment, sealing mechanisms 30 may be mounted on both radially outer race structures 26a and 26b and the housing or other hydraulic cavity structure. And in yet another embodiment, sealing mechanisms may not be mounted but instead be formed between portions of radially outer race structures 26a and 26b in close proximity to portions of a fitted hydraulic cavity structure or housing as with, for example, a fluid bearing.

Those close proximity portions may be designed to fit with corresponding structure of the other part or parts forming a hydraulic cavity. Example of portions of the radially outer race structures 26a and 26b may include an edge or shoulder 40 on the distal surface of the radially outer race structures 26a and 26b. The outer surface of radially outer race structures 26a and 26b may be considered in some embodiments to be a surface or surfaces opposite to the arcuate rolling contact surfaces 28a and 28b. Edge 40 is designed to nest into a corresponding surface of a housing or other hydraulic cavity structure to establish a hydraulic seal on one side of a hydraulic cavity. A second edge or shoulder 42 may be formed to form a second hydraulic seal on another side of the hydraulic cavity. In one embodiment, the second edge 42 may be formed of an edge protruding from an outer surface of radially outer race structures 26a and 26b. In an embodiment, second edge 42 may be formed as an edge around opening 44 through which shaft 11, inner race, planet carrier, planet followers, and other CVT components may fit.

FIG. 5B shows a side view of a radially outer race structure 26a or 26b. Sealing mechanisms 30 are mounted on a first edge or shoulder 40 on the distal surface of the radially outer race structure 26a or 26b and a second edge or shoulder 42 respectively. Between the sealing mechanisms 30 on the first 40 and second edge 42 is part of the radially outer race structure 26a or 26b forms one side of a hydraulic cavity. Opening 44 allows for passage of CVT components such as an input shaft, inner race, planet carrier, and planet followers among other components. Opening 44, and second edge 42, are round in the present embodiment permitting rotation of the CVT components that pass through opening 44. First edge or shoulder 40 is of a polygonal shape 46 in the present embodiment. The profile polygonal shape 46 of first edge 40 fits correspondingly with a polygonal shape of a housing of the CVT or an outer race hydraulic cavity housing or other hydraulic cavity structure to form a side of the hydraulic cavity. The profile polygonal shape 46 of first edge 40 in some embodiments prevents rotation of outer race 26 about the axis of rotation of the input shaft. In other embodiments, the profile polygonal shape 46 of first edge 40 prevents rotation of radially outer race structure 26a or 26b separate from an outer race hydraulic cavity housing or other hydraulic cavity structure. It is understood that any polygon may be used and that partial polygons or shapes with a straight edge or an angle may be used instead to achieve a similar purpose to a polygonal shape. In other embodiments, a spline structure or post structure may be used to hold the radially outer race structure 26a or 26b non-rotationally relative to a hydraulic cavity structure or housing.

Turning back to FIG. 2, an embodiment is shown with a sealing mechanism 30 mounted in an edge or shoulder 50 of housing 10 corresponding to first edge 40 of radially outer race structure 26a. Another sealing mechanism 30 is mounted in an edge or shoulder 52 of housing 10 corresponding to second edge 42 as described above for radially outer race structure 26b. Each hydraulic cavity 29 is between radially outer race structure 26a or 26b and housing 10 in the embodiment of FIG. 2. Profile polygonal shape 46 of first edge 40 is designed to fit nestingly into housing 110 so outer race 26 is non-rotatable in this embodiment. In other embodiments, outer race 26 may not have a profile polygonal shape, but instead may have a rounded shape to allow rotation of outer race 26 and allow coupling to an output or input shaft.

FIG. 2 also shows detail of inner race 23. Radially inner race structures 23a and 23b are operatively coupled to one or more torque sensitive inclined plane structures. In an embodiment, one half of the inclined plane structure may be formed in radially inner race structures 23a and 23b. In the shown embodiment, radially inner race structures 23a and 23b are operatively coupled to race load ramp inner parts, 62a and 62b respectively, of a race load ramp. In this embodiment a ball ramp is shown, but other torque sensitive inclined plane structures are also contemplated. The ball ramp of the present embodiment includes race load ramp inner parts 62a and 62b, race load ramp outer parts 63a and 63b, and an intermediate spherical structure 64a and 64b such as a ball, oblate or roller pin. In other embodiments, the inner half of the inclined plane structure may be formed in radially inner race structures 23a and 23b, and not be a separate structure. The radially inner race structures 23a and 23b may be operatively coupled to shaft 11 via splines 24 in the current embodiment. However, additional coupling mechanisms are contemplated as disclosed above. Additionally, in the present embodiment, radially inner race structures 23a and 23b are operatively coupled to shaft 11 via intermediate race load ramp inner parts 62a and 62b respectively. Race load ramp inner parts 62a and 62b are in turn operatively coupled to shaft 11 via a spline or other coupling mechanism. The radially inner race structures 23a and 23b may be operatively coupled to shaft 11 via splines 24 in the current embodiment with different intermediate structures or no intermediate structures.

The spherical structure of inclined planes 64a and 64b are also operatively coupled to race load ramp inner parts 62a and 62b and race load ramp outer parts 63a and 63b to establish symmetrical urging of radially inner race structures 23a and 23b inward during changes in torque. Similarly, inclined planes 64a and 64b may relax inward urging of radially inner race structure 23a and 23b during a reverse in torque. An example of an inclined plane structure may include a ball ramp splined to shaft 11 and operatively coupled to radially inner race structures 23a and 23b via race load ramp inner parts 62a and 62b. Spring 17 also establishes an inwardly urging preload force on radially inner race structures 23a and 23b to counter adjustments in transmission ratios at the outer race 26. This preload force of spring 17 may be sufficient to cause clamping for radially inner races 23a and 23b in the present embodiment for compensation during shifting of the CVT. Additionally, spring 17 may function as a torsion damping mechanism to reduce backlash during torque transitions such as torque reversal in the CVT system. Spring 17 may apply a priming torque as described further above. It is understood that radially inner race structures 23a and 23b and race load ramp inner parts 62a and 62b may instead be a single radially inner race structure or may be multiple components coupled between shaft 11 and the rolling contact surfaces with spherical planetary members 25. Upon a torque transition, the clamping of the torque sensitive inclined plane mechanism adjusts. For example, in a torque reversal, the torque sensitive inclined plane mechanism is symmetrical and reverses to an opposite side of the ball ramp, roller ramp, etc. Application of a torsion damping mechanism (not shown in FIG. 4) reduces backlash from such a torque transition with application of a priming torque to the system.

In an embodiment of FIG. 2, race load ramp inner parts 62a and 62b have extension surfaces 66a and 66b respectively extending from respective facing surfaces between each race load ramp 62a and 62b. Similarly, extension surfaces 66a and 66b may extend from the radially inner race structures 23a and 23b in other embodiments; for example, where the race load ramp inner part and radially inner race structure are a single piece structure. In an embodiment, the extension surface 66b fits into extension surface 66a. The reverse relationship is contemplated in other embodiments as well as various combinations of geometrical shapes designed to fit together. Radially inner race structures 23a and 23b and/or race load ramp inner parts 62a and 62b remain axially movable with respect to one another. However, radially inner race structures 23a and 23b remain axially aligned. Moreover, extension surfaces 66a and 66b may be polygonal or have a spline feature to cause radially inner race structures 23a and 23b to be rotationally constrained to one another.

The radially inner race structures 23a and 23b are rotationally constrained with respect to one another and are under urging of a ball ramp, springs or other mechanisms. With this or similar embodiments, a spherical planetary member 25 cannot advance into the radially inner race structures 23a and 23b more on either side during a transmission ratio shift involving narrowing the orbit or radius of rotation of the spherical planetary member. This may occur with imperfect clamping by the radially inner race structures 23a and 23b in compensating on movement of spherical planetary member 25. The race load ramp inner parts 62a and 62b and radially inner race structures 23a and 23b are approximately locked in timing and rotation such that one cannot advance on an inclined plane structure such as a ball ramp or helical interengagement differently from the other. This also has an effect of reducing or eliminating float of the spherical planetary member 25 due to any float of the hydraulically actuated radially outer race structures 26a and 26b. Control of float may also be controlled by control of hydraulic displacement to either or both sides of outer race 26. However, rotationally constrained radially inner race structures 23a and 23b in addition to an inclined plane coupling of a ball ramp or other structure may also reduce or eliminate float of the inner race 23, outer race 26 and spherical planetary members 25. Reducing float may avoid potential damage to follower 15 or radial plates 14a or 14b due to axial misalignment.

In another embodiment discussed above but not shown, the race load ramp inner parts 62a and 62b are coupled to shaft 11 via a helical interengagement in the form of a screw threaded engagement. Torque on shaft 11 may cause urging of radially inner race structures 23a and 23b inwardly if screw threads are opposite for each of race load ramp inner parts 62a and 62b. Which direction of torque in shaft 11 urges the radially inner race structures 23a and 23b inwardly depends on the arrangement of the helical threading. The reverse torque direction will relax the helical interengagement and permit the radially inner race structures to separate. Either direction of torque on shaft 11 is contemplated to urge the radially inner race structures inward in such embodiments.

Figure 6A:
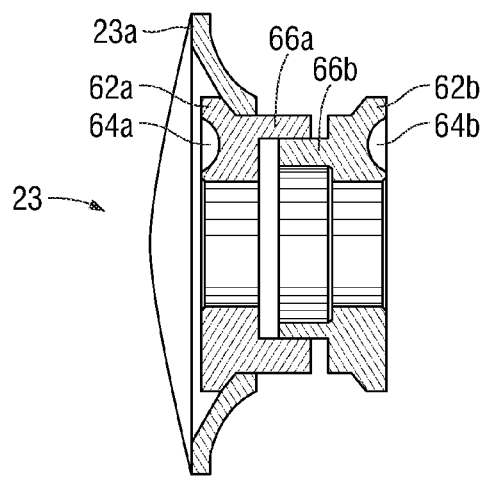
FIG. 6A is a schematic axial section view of an inner race component according to an embodiment of the present disclosure.
Figure 6B:
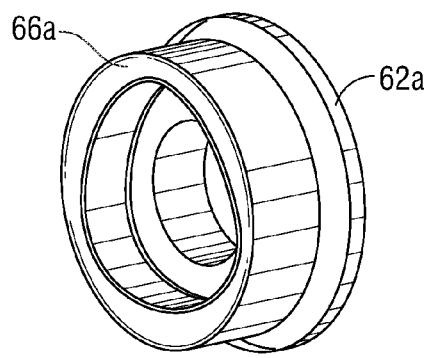
FIG. 6B is a schematic view of an inner race component according to an embodiment of the present disclosure.
Figure 6C:
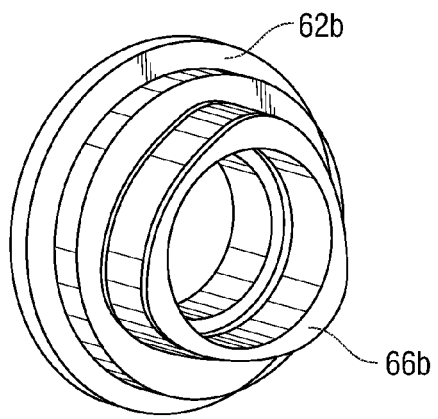
FIG. 6C is a schematic view of another inner race component according to an embodiment of the present disclosure.

FIGS. 6A, 6B, and 6C show additional detail of race load ramp inner parts 62a and 62b as disclosed in one embodiment of FIG. 2. FIG. 6A depicts a partial cross sectioned view of an inner race 23 according to an embodiment of the present disclosures. Radially inner race structure 23a is coupled to race load ramp inner part 62a in this embodiment. For simplicity, radially inner race structure 23b is not shown coupled to race load ramp inner part 62b. Each race load ramp inner part 62a and 62b is part of a ball ramp, such as that including spherical structures 64a and 64b respectively. Race load ramp inner part 62a has an extension surface 66a that fits correspondingly into a cavity formed by extension surface 66b of race load ramp inner part 62b. Extension surfaces 66a and 66b extend from surfaces facing one another between race load ramp inner parts 62a and 62b during operation. Extension surfaces 66a and 66b still allow race load ramp inner parts 62a and 62b to move axially in alignment. Any combination of extension surfaces or edges of surfaces 66a and 66b in geometries that fit together is contemplated.

FIG. 6B depicts an angle view of race load ramp inner part 62a according to one embodiment. As can be seen from FIG. 6B, extension surface 66a is such that a polygonal cavity is established inside an edge of extension surface 66a. FIG. 6C depicts an angle view of race load ramp inner part 62b according to one embodiment. As can be seen from FIG. 6C, extension surface 66b is a polygonal extension surface that fits correspondingly into polygonal cavity of extension surface 66a. In other embodiments, extension surfaces extension surfaces 66a and 66b may be of other shapes so as to fit correspondingly and maintain rotational symmetry between race load ramp inner parts 62a and 62b and, thus, radially inner race structures such as those described in embodiments above. Similarly, other embodiments may use a spline, dowel pegs, or other structures to rotationally constrain race load ramp inner parts 62a and 62b white allowing axial movement as is understood. As explained in other embodiments, similar structure to rotationally constrain may be designed into radially inner race structures 23a and 23b directly, or additional intermediate structures may be used to rotationally constrain radially inner race structures 23a and 23b with respect to one another.

Figure 7:
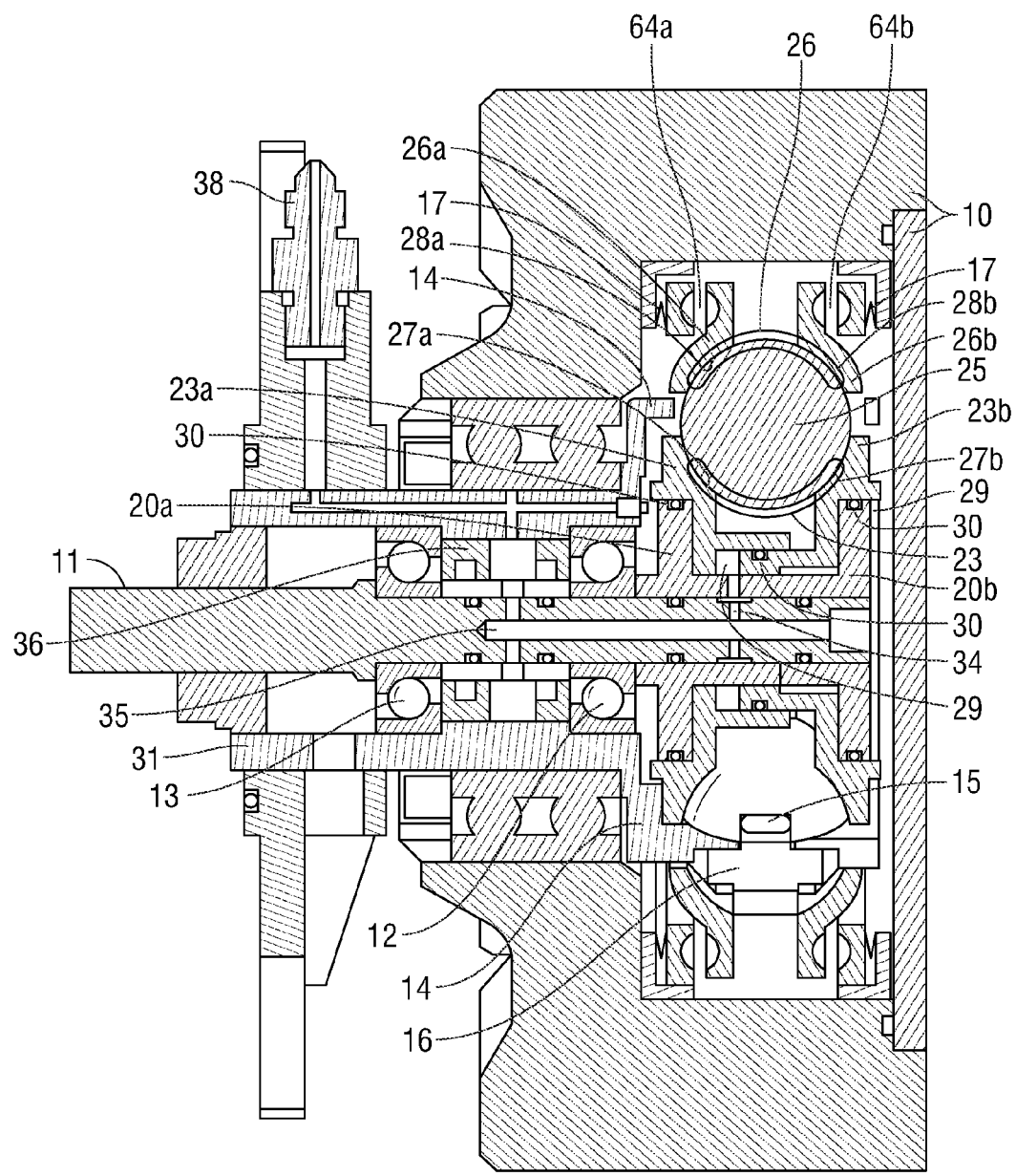
FIG. 7 is an axial sectional schematic view of a continuously variable transmission device according to another embodiment of the present disclosure.

FIG. 7 shows a continuously variable transmission (CVT) in another embodiment of the present disclosures. In the example embodiment, the CVT is a variable radius epicyclical transmission device. In this embodiment the same reference numerals are used to identify the same or similar components as in other embodiments.

In the example embodiment of FIG. 7, the CVT shown depicts a housing 10 within which is mounted a sun shaft 11 bearing rolling element bearings 12, 13. Planet carrier 14 carries three planet follower members 15. The planet follower members 15 are rotatably borne on the planet carrier 14 by planet follower shafts 16. Any number of planet follower members 15 are contemplated and may depend on the number of spherical planetary members 25. The spherical planetary members 25 are substantially spherical as described above with respect to FIG. 1. Spherical planetary members are captive between radially inner races 23 and the radially outer races 26, with planet follower members 15 circumferentially intercalated between adjacent pairs of spherical planetary members 25 for transmitting drive to or from the said spherical planetary members 25. In an embodiment, planet follower members 15 are carried on planet carrier 14 by planet follower shafts 16 which transmit drive to or from spherical planetary members 25 in operation of the CVT device.

The planet carrier 14 effectively includes a radial plate together with shouldering studs forming the planet follower shafts 16. In the present embodiment, outer race structures 26a and 26b are rotationally constrained to housing 10 causing housing 10 to rotate as an output. It is understood that the input and output relationship described above may also be reversed in other embodiments.

Sun shaft 11 may carry a radially inner race 23 comprising a sun member further comprising two structures 23a, 23b which are engaged to the shaft 11. Radially inner race 23 may be coupled to the input shaft via a coupling comprising a spline or other coupling including a helical interengagement in the form of a screw threaded engagement (not shown). In one embodiment, radially inner race structures 23a and 23b are coupled to shaft 11 via a spline. Radially inner race structures 23a and 23b are axially movable along the axis of rotation of the sun shaft 11. Inward axial movement may be urged by a mechanical, electromechanical, or hydraulic mechanism as described in embodiments below.

The radially inner race structures 23a, 23b are coupled to hydraulic cavity structures 20a and 20b via hydraulic cavity 29. Hydraulic cavity structures, such as inner race hydraulic cavity housings 20a and 20b serve as a side of hydraulic cavity 29 and are coupled to sun shaft 11. As shown in one example embodiment, inner race hydraulic cavity housing 20b is coupled to sun shaft 11 via a threaded screw coupling which holds inner race hydraulic cavity housing 20a in place relative to a stop limit structure coupled to shaft 11. As before, shaft 11 may serve as an input or output shaft depending on configuration.

Hydraulic cavity 29 may act as an axial adjustment mechanism for radially inner race structures 23a and 23b via hydraulic displacement. Sealing mechanisms 30 such as an o-ring or fluid bearing seal form a hydraulic seal for cavity 29 between inner race hydraulic cavity housings 20a, 20b and radially inner race structures 23a, 23b. Other axial adjustment mechanisms are also contemplated in different embodiments including a mechanical system such as a lever or arm, screw mechanism, and electromechanical mechanism or other mechanism to axially adjust the distance between radially inner race structures 23a, 23b. In other embodiments, hydraulic cavity 29 may be formed between radially inner race structures 23a, 23b and an inner race hydraulic cavity housing not coupled to an input or an output shaft (not shown). In one such embodiment therefore, the inner race assembly may be rotatable with respect to an input or output shaft, including radially inner race structures 23a, 23b. In yet other embodiments, the hydraulic cavity 29 may be formed between radially inner race structures 23a, 23b and extensions of housing 10. In such an embodiment, the radially inner race structure 23*a*, 23*b* may be rotatable relative to housing 10 of the CVT which itself may be fixed or rotatable.

Spherical planetary members 25 are engaged between the radially inner race 23 and a radially outer race 26 also comprising two axially separated annular race structures 26*a*, 26*b*. Rolling contact surfaces of the race structures 23*a*, 23*b* and 26*a*, 26*b*, respectively identified as 27*a*, 27*b* and 28*a*, 28*b*, each comprise an arcuate surface in cross-section the radius of which is slightly greater than the radius of the spherical planetary members 25.

In the presently shown embodiment, preload springs 17 are used to apply a preload force to urge axial movement of radially outer race structures 26*a* and 26*b*. These preload springs may serve a dual purpose as described in embodiments above. Preload springs 17 may be heavy enough to serve as torsion damping mechanisms. Torsion damping mechanisms 17 apply torque sufficient to reduce backlash during torsional transition of the CVT of the present disclosures. Radially outer race structures 26*a* and 26*b* may be coupled to housing 10 via a torque sensitive inclined plane structure, such as ball ramp 64*a* and 64*b*. In the present embodiment, torsion damping mechanism (and preload spring) 17 is operatively coupled to the torque sensitive inclined plane structure 64*a* and 64*b*. In an embodiment, the torsion damping mechanism (and preload spring) 17 is operatively coupled to housing 10 which may be rotating. In other embodiments, not shown, torsion damping mechanism (and preload spring) 17 may operatively coupled to an annular shaft that may serve as either an input or output shaft.

In yet another embodiment, a separate torsion damping mechanism may be used (not shown). Such a separate torsion damping mechanism may be operatively coupled to the torque sensitive inclined plane mechanism of an outer race similar to the presently described embodiment. The separate torsion damping mechanism may be operatively coupled to housing 10 or an annular shaft in various embodiments.

Torsional drive and torsional transitions may be received into the CVT system via the sun shaft, housing, or an annular shaft depending upon the embodiment. As described herein, any of a sun shaft 11, housing 10, annular shaft (not shown) or carrier shaft may serve as input or output depending upon the coupling of the CVT systems described in embodiments herein.

Other couplings to the housing 10 are also contemplated including helical interengagement by one or both radially outer race structures 26*a* and 26*b*. Thread direction relay be used to cause axial movement of one or both structures depending on rotation applied to radially outer race structures 26*a* and 26*b*. Radially outer race structures 26*a* and 26*b* may be non-rotatable in that only some rotation may occur via the helical interengagement or an inclined plane as described. In some embodiments, the two radially outer race structures 26*a* and 26*b* may be coupled via oppositely handed threads so that, for reasons which are described in more detail in above and in U.S. Pat. No. 6,641,268 incorporated herein fully by reference, a relative rotation of the radially outer race structures 26*a* and 26*b* relative to housing 10 in one directional sense will cause the two race structures to be displaced towards one another to clamp radially outer race structures 26*a* and 26*b* to spherical planetary member 25. Similarly, axial separation of the two radially outer race structures 26*a* and 26*b* occurs where there is relative rotation in the opposite directional sense. In other embodiments, radially outer race structures 26*a* and 26*b* may be rotatable relative to housing 10 as well as inner race 23, and follower members 15.

In operation, sun shaft 11, as an input shaft in one embodiment, transmits rotation of the shaft 11 to the inner race 23, the rotation of which causes rotation of the spherical planetary members 25 by rolling contact. The spherical planetary members 25 are in rolling contact with outer race 26. In one embodiment, outer race 26 may be non-rotating relative to rotation of the CVT housing 10. In the shown embodiment, housing 10 rotates as an output. In other embodiments, outer race 26 may rotate and connect to an output shaft. Rotation of the spherical planetary members 25 is transmitted via the planet followers 15 to the planet carrier 14 and thus to an output shaft 31 in one embodiment. In other embodiments, the planet carrier 14 is held at zero rotation and the rotation is transmitted to outer race 26. Spherical planetary members 25 are also in rolling contact with outer race 26. By hydraulic displacement in hydraulic chamber 29 via either increased or decreased hydraulic fluid, the two radially inner race structures 23*a*, 23*b* of the inner race can be urged towards one another or allowed to move axially away from one another respectively.

Axial approach of the two radially inner race structures 23*a*, 23*b* applies pressure to the spherical planetary members 25 causing the spherical planetary members 25 to move radially outwardly and urge the two radially outer race structures 26*a*, 26*b* apart to increase transmission ratio. In an embodiment, a ball ramp 64*a* and 64*b* between the radially outer race structures 26*a*, 26*b* and the spring 17 and housing 10 act in effect as a torque-sensitive mechanism in that the ball ramp limits rotation of the two radially outer race structures 26*a*, 26*b* in either direction relative to the housing 10 in the current embodiment. Rotation of the outer race 26 in either direction causes the race structures 26*a*, 26*b* to approach one another axially when resisted by drag so that any play in the rolling contact between the races and the spherical planetary members 25 is taken up and compensated by the tendency of the race structures 26*a*, 26*b* to approach one another until the forces exerted on the ball ramps 64*a*, 64*b* between the race structures 26*a*, 26*b* and the housing 10 matches the reaction forces between the race structures 26*a*, 26*b* and the spherical planetary members 25. At this point no further relative axial displacement of the race structures 26*a*, 26*b* takes place and drive transmission takes place at a transmission ratio determined by the radial position of the spherical planetary members 25 relative to shaft 11. Alternatively or in addition, the radially outer race structures may utilize a torque-sensitive coupling in the form of a helical interengagement such as that described in embodiments above. Other torque-sensitive mechanism arrangements are also contemplated using a variety of inclined plane structures which may or may not include rotating or ball structures to reduce friction.

As can be seen in FIG. 7, radially inner race structures 23*a* and 23*b* form inner race 23 which may be in rolling contact with spherical planetary member 25. Hydraulic cavity 29 is formed between radially inner race structures 23*a* and 23*b* and inner race hydraulic cavity housings 20*a* and 20*b*. It is understood that a hydraulic cavity 29 need only be formed on one side of race 23 to function as an axial displacement control mechanism for race 23. In other embodiments, CVT housing 10 may serve as inner race hydraulic cavity housings 20*a* and 20*b* as described above. In yet other embodiments, hydraulic cavity 29 may be formed between radially inner race structures 23*a* and 23*b* and an inner race hydraulic cavity housing, which may include an outer race hydraulic cavity housing (not shown), separate from the CVT housing 10. Hydraulic port 34 permits adjustment to hydraulic pressure and fluid levels in the hydraulic cavity 29. Input or removal of hydraulic fluid may be made via connector port 38. Hydraulic port 34 is linked to connector port 38 via a hydraulic line 35 and in shaft 11. Since shaft 11 may be rotating, hydraulic line 35 may link to connector port 38 via a rotating hydraulic connection 36. In the embodiment of FIG. 7, hydraulic port 34 provides uniform application of hydraulic pressure in a common hydraulic cavity 29 associated with radially inner race structures 23a and 23b. Hydraulic displacement with increase of hydraulic fluid will axially urge radially inner race structures 23a and 23b together while reduction of hydraulic fluid will cause negative displacement and allow radially inner race structures 23a and 23b to separate axially. Thus, some uniformity and symmetry may be maintained between radially inner race structures 23a and 23b, especially when positive hydraulic pressure is applied.

Nonetheless, it is possible for radially inner race structures 23a and 23b to float or slide to one or the other side causing spherical planetary members 25 and outer race 26 to also potentially slide in some embodiments. This is addressed more fully similar to the embodiments described above for FIGS. 1-6. Input port 38 allows for hydraulic fluid connection to the CVT to allow control over hydraulic displacement for radially inner race structures 23a and 23b via one or more hydraulic cavities 29. Sealing mechanisms 30 are used to establish a hydraulic cavity between radially inner race structures 23a and 23b and inner race hydraulic cavity housing 20 in the current embodiment. An inner race hydraulic cavity housing or other hydraulic cavity structure may also be fitted with radially inner race structures 23a and 23b of varied shapes (not shown) to accommodate a hydraulic cavity in other embodiments. The sealing mechanisms 30 may be an o-ring, a sealing layer, or a fluid bearing formed of hydraulic fluid at a junction point or points that are in close proximity between radially inner race structures 23a and 23b and hydraulic structures 20a, 20b. In the present embodiment, only three sealing mechanisms 30 are shown, two between the hydraulic structures 20a, 20b and radially inner race structures 23a and 23b and one between radially inner race structures 23a and 23b. Such junction points may be, for example, edges or shoulders of radially inner race structures 23a and 23b and corresponding edges or shoulders of inner race hydraulic cavity housing 20a, 20b or the other radially inner race structure designed to fit together in close proximity. The sealing mechanisms 30 may permit radially inner race structures 23a and 23b to still move axially. In some embodiments, sealing mechanisms 30 may permit radially inner race structures 23a and 23b to rotate about the axis shaft 11.

Similar to that described above, it may be seen that when the radius of rolling contact between the spherical planetary members 25 and the inner race 23 is relatively small and the radius of contact between the spherical planetary members 25 and the outer race 26 is also relatively small, the transmission ratio between the shaft 11 and rotating housing 10 or an output shaft (not shown) is at a low level. By actuating hydraulic displacement in hydraulic cavity 29, radially inner race structures 23a and 23b are urged to move together so that the spherical planetary members 25 can move radially outwardly compensated by axial approach of the radially outer race structures 26a, 26b having arcuate rolling contact surfaces 28a, 28b. This increases the transmission ratio between the shaft 11 and output drive source such as rotating housing 10 or an output shaft. It is appreciated that a reverse ratio relationship may be established by reversing an output drive source and an input drive source.

By relaxing hydraulic displacement in hydraulic cavity 29 via negative displacement, radially inner race structures 23a and 23b are allowed to move apart so that the spherical planetary members 25 can move radially outwardly again compensated by axial approach of the radially outer race structures 26a, 26b. This again reduces the transmission ratio.

In the CVT embodiments described herein, arrangement of input and output is not limited to as described above in FIGS. 1-7. It is understood that one or more input shafts may be linked to any one or more of the inner race 23, planet carrier 14, or outer race 26. Likewise, it is contemplated that one or more output shafts or other structures may be linked to any one or more of the inner race 23, planet carrier 14, or outer race 26 in various embodiments. Further, housing 10 may serve as an input or output of drive rotation and be coupled non-rotatably to any one or more of the inner race 23, planet carrier 14, or outer race 26. Any combination of input drive rotation via shaft, gear connection/hub, rotational housing, belt drive, or other is contemplated.

Figure 8:
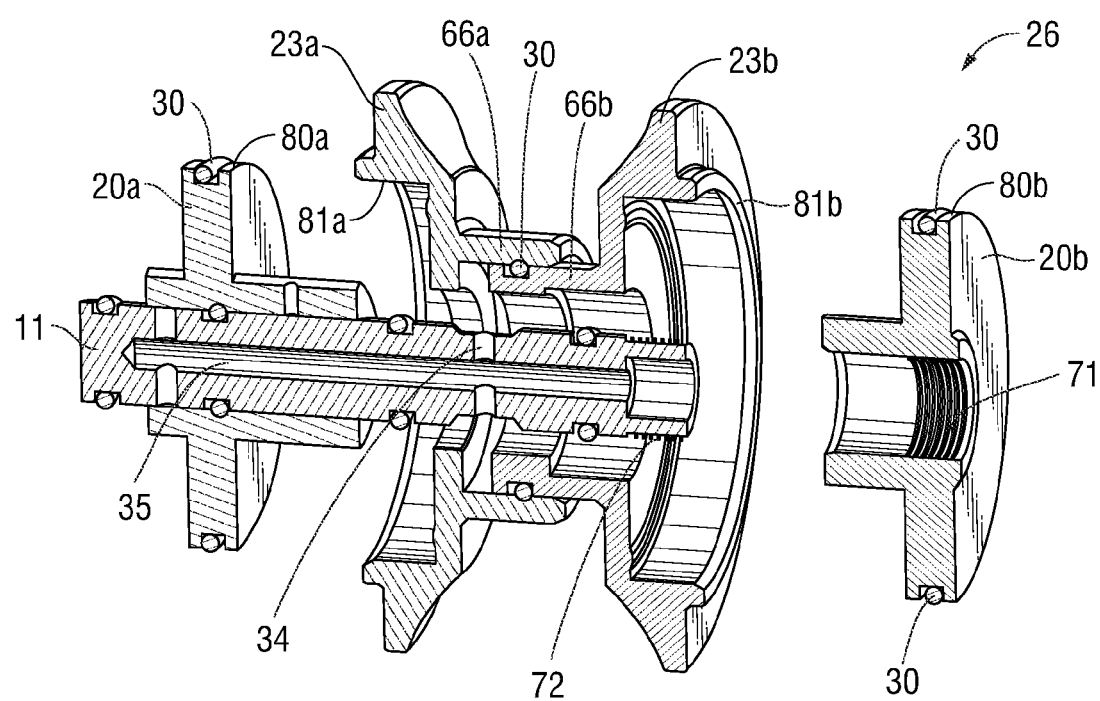
FIG. 8 is an axial sectional schematic view of an inner race assembly according to an embodiment of the present disclosure.

FIG. 8 shows an axial cross-section view of an inner race assembly 60 of a continuously variable transmission (CVT) according to an embodiment of the present disclosures. Inner race assembly 26 includes shaft 11, radially inner race structures 23a and 23b, inner race hydraulic cavity housings 20a and 20b, and a plurality of sealing mechanisms 30. Hydraulic port 34 is connected to hydraulic line 35 within shaft 11. Since FIG. 8 is also an exploded view for ease of viewing, hydraulic cavities are not shown intact but would be formed between radially inner race structures 23a and 23b and inner race hydraulic cavity housings 20a and 20b which slide inwardly on shaft 11 and fit correspondingly into radially inner race structures 23a and 23b. Inner race hydraulic cavity housing 20b is shown with helical threads 71 for attachment on corresponding threads 72 on shaft 11.

Radially inner race structures 23a and 23b are shown and include arcuate rolling contact surfaces 27a and 27b. Sealing mechanisms 30 are shown in the present embodiment mounted on an edge 80a and 80b of a disc-like extension of inner race hydraulic cavity housings 20a and 20b that correspond to a shoulder or edge 81a and 81b of a surface opposite to arcuate rolling contact surfaces 27a and 27b of radially inner race structures 23a and 23b. Corresponding edges or shoulders of radially inner race structures 23a and 23b and inner race hydraulic cavity housings 20a and 20b may be of any geometry to establish surfaces in close proximity to form a seal with a sealing mechanism. Edge 80a and 80b is designed to nest into a corresponding edge or shoulder surface 81a and 81b of radially inner race structures 23a and 23b to establish a hydraulic seal on one side of a hydraulic cavity. In other embodiments, sealing mechanisms 30 could also be mounted on the shoulder or edge 81a or 81b of radially inner race structures 23a and 23b in close proximity to inner race hydraulic cavity housings 20a and 20b. In yet other embodiments, such as with a fluid bearing, sealing mechanisms may not be mounted on either edge or surface, but form a seal by virtue of the proximity of the surfaces and presence of hydraulic fluid. In this example, embodiment o-ring sealing mechanisms are shown, but several alternate sealing mechanisms are contemplated including example embodiments discussed further above.

An additional sealing mechanism 30 may be mounted on an extension surface 66b of radially inner race structure 23b that fits correspondingly into a cavity formed by extension surface 66a of radially inner race structure 23a. Extension surfaces 66a and 66b extend from surfaces between radially inner race structures 23a and 23b. Extension surfaces 66a and 66b still allow radially inner race structures 23a and 23b to move axially in alignment. Extension surfaces 66a and 66b need not rotatably limit radially inner race structures 23a and 23b with respect to one another in one embodiment. In other words, the extension surfaces 66a and 66b may be circular to allow rotation of radially inner race structures 23a and 23b. In other embodiments, extension surfaces 66a and 66b may rotatably limit radially inner race structures 23a and 23b with respect to one another similar to that described with reference to FIGS. 4A and 4B. Extension surface 66b may be such that a polygonal cavity is established inside an edge of extension surface 66b. Extension surface 66a may be a polygonal extension surface that fits correspondingly into polygonal cavity of extension surface 66b. In other embodiments, extension surfaces 66a and 66b may be of other shapes so as to fit correspondingly and maintain rotational symmetry between radially inner race structures 23a and 23b or race load ramp inner parts as described above. For example, other embodiments may use a spline, dowel pegs, or other structures to rotationally constrain radially inner race structures 23a and 23b while allowing axial movement as is understood. In the current embodiment, extension surfaces 66a and 66b establish surfaces in close proximity and a sealing mechanism may be mounted or formed between them to form a second hydraulic seal on another side of the hydraulic cavity. Hydraulic seam mechanisms similar to the sealing mechanisms described above may be used. As shown in FIG. 6, for example, a sealing mechanism 30 that may be an o-ring is mounted to extension surface 66b of radially inner race structure 23b. In other embodiments, sealing mechanism 30 may be mounted to extension surface 66a. In yet another embodiment, one or more additional edges or shoulders may be formed elsewhere on radially inner race structures 23a and 23b with a corresponding edge or shoulder structure on inner race hydraulic cavity housings 20a and 20b to form a second hydraulic seal by virtue of surfaces of radially inner race structures 23a and 23b and inner race hydraulic cavity housings 20a and 20b being in close proximity and having a sealing mechanism. The one or more additional hydraulic seating mechanisms of these embodiments establish another side of the hydraulic cavity.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, components, and/or groups, but do not preclude the presence or addition of one or more other features, integers, steps, operations, elements, components, or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element is referred to as being "on," "engaged to," "connected to," or "coupled to" another element or layer, it may be directly on, engaged, connected or coupled to the other element or layer, or intervening elements or layers may be present. Other words used to describe the relationship between elements should be interpreted in a like fashion (e.g., "between" versus "directly between," "adjacent" versus "directly adjacent," etc.). As used herein, the term "or" includes any and all combinations of one or more of the associated listed items. For example, a list of items A or B is satisfied by any one of the following: just A is present or occurs, just B is present or occurs, and both A and B are present or occur. Similarly, in descriptions of embodiments in the specification the term "and" is similarly broad and the various embodiments contemplated may include any and all combinations of one or more of the associated listed items.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A radially inner race and a radially outer race for a continuously variable transmission (CVT) comprising:
   the radially inner race, having a first inner race structure and a second inner race structure spaced along an axis wherein at least one of the first inner race structure or the second inner race structure is axially movable and wherein the first inner race structure and the second inner race structure are rotationally constrained with respect to each other;
   the radially outer race, having a first outer race structure and a second outer race structure spaced along an axis wherein at least one of the first outer race structure or the second outer race structure is axially movable and wherein the first outer race structure and the second outer race structure are rotationally constrained with respect to each other;
   a sun shaft operatively coupled to the radially inner race;
   planetary members in rolling contact with the radially inner race;
   at least one inner race structure operatively coupled to a torque sensitive inclined plane structure; and
   a torsion damper operatively coupled to the first inner race structure to apply torque between the first inner race structure and the sun shaft to reduce a transition amplitude during a torque impulse.

2. The radially inner race of claim 1, wherein the torsion damper operatively coupled to the first inner race structure applies torque between the first inner race structure and the sun shaft to reduce a transition deadband during a torque reversal.

3. The radially inner race of claim 1, wherein the torsion damper is a spring also applying a preload force axially on the first inner race structure to maintain contact between the inner race and the planetary members.

4. The radially inner race of claim 1, further comprising:
   a preload spring operatively coupled to the first inner race structure applying a preload force axially on the first inner race structure to maintain contact between the inner race and the planetary members.

5. The radially inner race of claim 2, further comprising:
   a second torsion damper operatively coupled to the second inner race structure to apply torque to the second inner race structure to reduce a transition deadband during a torque reversal.

6. The radially inner race of claim 1, wherein the torsion damper is a compression spring applying an angular displacement torque on the first inner race structure.

7. The radially inner race of claim 1, wherein the torsion damper is a torsion spring applying an angular displacement torque on the first inner race structure.

8. The radially inner race of claim 1, wherein the torque sensitive inclined plane structure is a ball ramp interposed between first inner race structure and the torsion damping mechanism.

9. The radially inner race of claim 1, wherein the torsion damper applies a torque to permit angular displacement above 15° between the sun shaft and the first inner race structure.

10. The radially inner race of claim 1, wherein the first inner race structure and the second inner race structure are rotationally constrained with respect to each other via fitting engagement between the first inner race structure and the second inner race structure.

11. A radially inner race and a radially outer race for a continuously variable transmission (CVT) comprising:
the radially inner race, having a first inner race structure and a second inner race structure spaced along an axis wherein at least one of the first inner race structure or the second inner race structure is axially movable and wherein the first inner race structure and the second inner race structure are rotationally constrained with respect to each other;
the radially outer race, having a first outer race structure and a second outer race structure spaced along an axis wherein at least one of the first outer race structure or the second outer race structure is axially movable and wherein the first outer race structure and the second outer race structure are rotationally constrained with respect to each other;
planetary members in rolling contact with the radially outer race;
at least one outer race structure operatively coupled to a torque sensitive inclined plane structure; and
a torsion damper operatively coupled to the first outer race structure to apply torque to the first outer race structure to reduce a transition amplitude during a torque impulse.

12. The radially outer race of claim 11, wherein the torsion damper operatively coupled to the first outer race structure applies torque to the first outer race structure to reduce a transition deadband during a torque reversal.

13. The radially outer race of claim 11, wherein the torsion damper is a spring also applying a preload force axially on the first outer race structure to maintain contact between the outer race and the planetary members.

14. The radially outer race of claim 11, further comprising:
a preload spring operatively coupled to the first outer race structure applying a preload force axially on the first outer race structure to maintain contact between the outer race and the planetary members.

15. The radially outer race of claim 12, further comprising:
a second torsion damper operatively coupled to the second outer race structure to apply torque to the second outer race structure to reduce a transition deadband during a torque reversal.

16. The radially outer race of claim 11, wherein the torsion damper is a compression spring applying an angular displacement torque on the first outer race structure.

17. The radially outer race of claim 11, wherein the torsion damper is a torsion spring applying an angular displacement torque on the first outer race structure.

18. The radially outer race of claim 11, wherein the torque sensitive inclined plane structure is a ball ramp interposed between first outer race structure and the torsion damping mechanism.

19. The radially outer race of claim 11, wherein the torsion damper applies a torque to permit angular displacement above 15° between the input shaft and a CVT.

20. The radially outer race of claim 11, wherein the first outer race structure and the second outer race structure are rotationally constrained with respect to each other via fitting engagement between the first outer race structure and the second outer race structure.

21. A method of torsional damping a continuously variable transmission (CVT) comprising:
operatively coupling a torsion damper to a first inner race structure of a radially inner race or a first outer race structure of a radially outer race wherein the radially inner race has the first inner race structure and a second inner race structure spaced along an axis wherein at least one of the first inner race structure or the second inner race structure is axially movable and wherein the first inner race structure and the second inner race structure are rotationally constrained with respect to each other, and wherein the radially outer race has the first outer race structure and a second outer race structure spaced along an axis wherein at least one of the first outer race structure or the second outer race structure is axially movable and wherein the first outer race structure and the second outer race structure are rotationally constrained with respect to each other;
clamping the radially inner race or the radially outer race to planetary members via a torque sensitive inclined plane mechanism when torque is applied in a first direction wherein the planetary members are in rolling contact with the radially inner race or the radially outer race;
reversing torque to a second direction; and
applying torque via the torsion damper to the radially inner race or the radially outer race to reduce a transition amplitude during a torque impulse.

22. The method of torsional damping of claim 21, wherein applying torque via the torsion damper reduces a transition deadband during a reversal of torque.

23. The method of torsional damping of claim 21, wherein the torsion damper is a spring.

24. The method of torsional damping of claim 21, further comprising:
applying an axial preload force to the first race structure via the torsion damper to maintain contact between the radially inner race or the radially outer race and the planetary members.

25. The method of torsional damping of claim 21, further comprising:
applying an axial preload force to the first race structure via a preload spring operatively coupled to the first race structure to maintain contact between the radially inner race or the radially outer race and the planetary members.

26. The method of torsional damping of claim 21, further comprising:
applying torque via a second torsion damper operatively coupled to a second race structure of the radially inner race or the radially outer race.

27. The method of torsional damping of claim 26, wherein the first and second torsion damper are springs applying symmetrical angular displacement torque on the first race structure and the second race structure respectively.

* * * * *